(12) United States Patent
Shimono et al.

(10) Patent No.: US 7,556,450 B2
(45) Date of Patent: Jul. 7, 2009

(54) WATER COLLECTING STRUCTURE AND DRAINAGE STRUCTURE USING THE SAME

(75) Inventors: Masahiro Shimono, Kobe (JP); Kenji Watanabe, Kobe (JP)

(73) Assignee: Ito Yogyo Co., Ltd., Kobe (JP)

( * ) Notice: Subject to any disclaimer, the term of this patent is extended or adjusted under 35 U.S.C. 154(b) by 277 days.

(21) Appl. No.: 10/586,583

(22) PCT Filed: Jan. 17, 2005

(86) PCT No.: PCT/JP2005/000477

§ 371 (c)(1),
(2), (4) Date: Jul. 19, 2006

(87) PCT Pub. No.: WO2005/071174

PCT Pub. Date: Aug. 4, 2005

(65) Prior Publication Data

US 2008/0232900 A1    Sep. 25, 2008

(30) Foreign Application Priority Data

Jan. 23, 2004    (JP) ............... 2004-015242

(51) Int. Cl.
*E01F 5/00* (2006.01)
(52) U.S. Cl. .................... 404/2; 404/4; 404/5
(58) Field of Classification Search ......... 404/2–4, 404/21
See application file for complete search history.

(56) References Cited

U.S. PATENT DOCUMENTS 3,156,168 A * 11/1964 Nagin et al. ............ 404/21
3,299,785 A * 1/1967 James ..................... 404/4
4,553,874 A * 11/1985 Thomann et al. .......... 404/4
4,955,752 A * 9/1990 Ferns ..................... 404/2
4,968,170 A * 11/1990 Wilson et al. ............ 404/2
5,462,382 A * 10/1995 Sauerwein et al. ........ 404/2
2004/0003549 A1* 1/2004 Lawson ................... 52/168

FOREIGN PATENT DOCUMENTS

| GB | 2217364 | * | 10/1989 |
| JP | 9-184104 A | | 7/1997 |
| JP | 10-43831 A | | 2/1998 |
| JP | 2001-159189 A | | 6/2001 |

OTHER PUBLICATIONS

International Search Report of PCT/JP2005/000477 date of mailing Feb. 22, 2005.

* cited by examiner

*Primary Examiner*—Raymond W Addie
(74) *Attorney, Agent, or Firm*—Westerman, Hattori, Daniels & Adrian, LLP.

(57) ABSTRACT

The invention relates to a water collecting structure 1 capable of positively capturing flowing water which may form a shooting flow.

The water collecting structure 1 of the invention includes: a guide member 23 including a water channeling surface 23a inclined at a greater angle than that of a water-flow slope of a water-flow surface; and a plurality of flow straightening plates 24 extended along a flow direction of the guide member 23 and juxtaposed in a direction orthogonal to the flow direction. The flow straightening plate 24 includes a planar or curved lateral side 24a which cooperates with the water channeling surface 23a to define a substantially rectangular small channel S and which stands vertically to the water channeling surface 23a or inclined relative to the water channeling surface to widen the small channel toward top.

4 Claims, 6 Drawing Sheets

WATER COLLECTING STRUCTURE AND DRAINAGE STRUCTURE USING THE SAME

TECHNICAL FIELD

The present invention relates to a water collecting structure enhanced in an intake function to take in rainwater flowing on a water-flow surface of road and the like, as well as to a drainage structure using the same.

BACKGROUND ART

In an open road where a vehicular road and a sidewalk are divided via sidewalk/vehicular-road boundary blocks, for example, an apron section is normally provided at a side of the vehicular road. The apron section includes a water-flow surface inclined downwardly toward a transversely outer side of the vehicular road. In such an apron section, a catch basin including a grating cover is longitudinally disposed at predetermined space intervals. The individual catch basins are interconnected by means of U-shaped ditches or water collecting pipes having a circular section, which are embedded under the apron section along the longitudinal direction.

On the water-flow surface of such an apron section at the side of the road, the occurrence of a so-called shooting flow having a small depth and high flow rate may be encountered if the inclination of the water-flow surface is increased to some degree (generally to 1% or more). Such a shooting flow passes over slots in the grating cover of the catch basin, and that may result in the vehicular-road side of the road being flooded with water.

In order to prevent the decrease of drainage performance associated with the occurrence of the aforesaid shooting flow, it may be contemplated to construct a water collecting structure wherein a guide member including a water channeling surface inclined at a greater angle than that of a water-flow slope of the water-flow surface is provided at an inlet portion (an upstream side) of the grating, whereby the shooting flow running along the guide member is positively guided into a catch passage.

DISCLOSURE OF THE INVENTION

Problem to be Solved by the Invention

However, the aforementioned water collecting structure is apt to trap air in the bottom of the flowing water in the form of the shooting flow running along the water channeling surface of the guide member. Hence, the flowing water may be separated from the water channeling surface of the guide member. This makes it impossible to positively guide the flowing water in the form of the shooting flow into the catch passage.

Accordingly, the invention has an object to provide a water collecting structure capable of positively taking in the flowing water even when the flowing water forms the shooting flow, as well as to provide a drainage structure using the same.

Means for Solving the Problem

For achieving the above object, the following technical means is adopted by the invention.

That is, a water collecting structure according to the invention comprises: a guide member including a water channeling surface inclined at a greater angle than that of a water-flow slope of a water-flow surface; and a plurality of flow straightening plates extended along a flow direction of the guide member and juxtaposed in a direction orthogonal to the flow direction, and is characterized in that the flow straightening plate includes a planar or curved lateral side which cooperates with the water channeling surface to define a substantially rectangular small channel and which stands vertically to the water channeling surface or inclined relative to the water channeling surface to progressively widen the small channel toward top.

According to the invention, the water collecting structure includes the plural flow straightening plates extended along the flow direction of the guide member and juxtaposed in the direction orthogonal to the flow direction. This flow straightening plate includes the planar or curved lateral side which cooperates with the water channeling surface to define the substantially rectangular small channel and which stands vertically to the water channeling surface or inclined relative to the water channeling surface to progressively widen the small channel toward top. Hence, the water flow on the water channeling surface is divided off at the opposite sides thereof by means of the lateral sides of the flow straightening plates. Accordingly, the water flowing on the water channeling surface is prevented from trapping the air in the bottom thereof. Thus, the separation of the flowing water from the water channeling surface may be avoided.

It is preferred in the above water collecting structure that an upper end surface of the flow straightening plate is flush with the water-flow surface.

In this case, the formation of a step which may block foot or vehicle traffic may be effectively obviated because the upper end surface of the flow straightening plate is flush with the water-flow surface.

It is preferred in the above water collecting structure that the upper end surface of the flow straightening plate is formed with an antislip tread.

In this case, pedestrians and vehicles may be prevented from slipping during passage because the antislip tread is formed at the upper end surface of the flow straightening plate.

In a road drainage structure comprising: a grating frame embedded in road in a manner that an upper end surface thereof is flush with a water-flow surface of the road; and a grating cover fitted in the grating frame in a manner to be flush with the water-flow surface, a drainage structure according to the invention is characterized in that any one of the above water collecting structures is disposed on an upstream side of the grating cover.

According to the above drainage structure, the provision of the above water collecting structure permits the drainage structure to positively take in the flowing water even when the flowing water forms the shooting flow.

Effect of the Invention

The drainage structure according to the invention is capable of positively taking in the flowing water even when the flowing water forms the shooting flow, thus achieving an increased drainage performance.

DESCRIPTION OF REFERENCE NUMERALS

The embodiments of the invention will hereinbelow be described with reference to the accompanying drawings.

Figure 1:
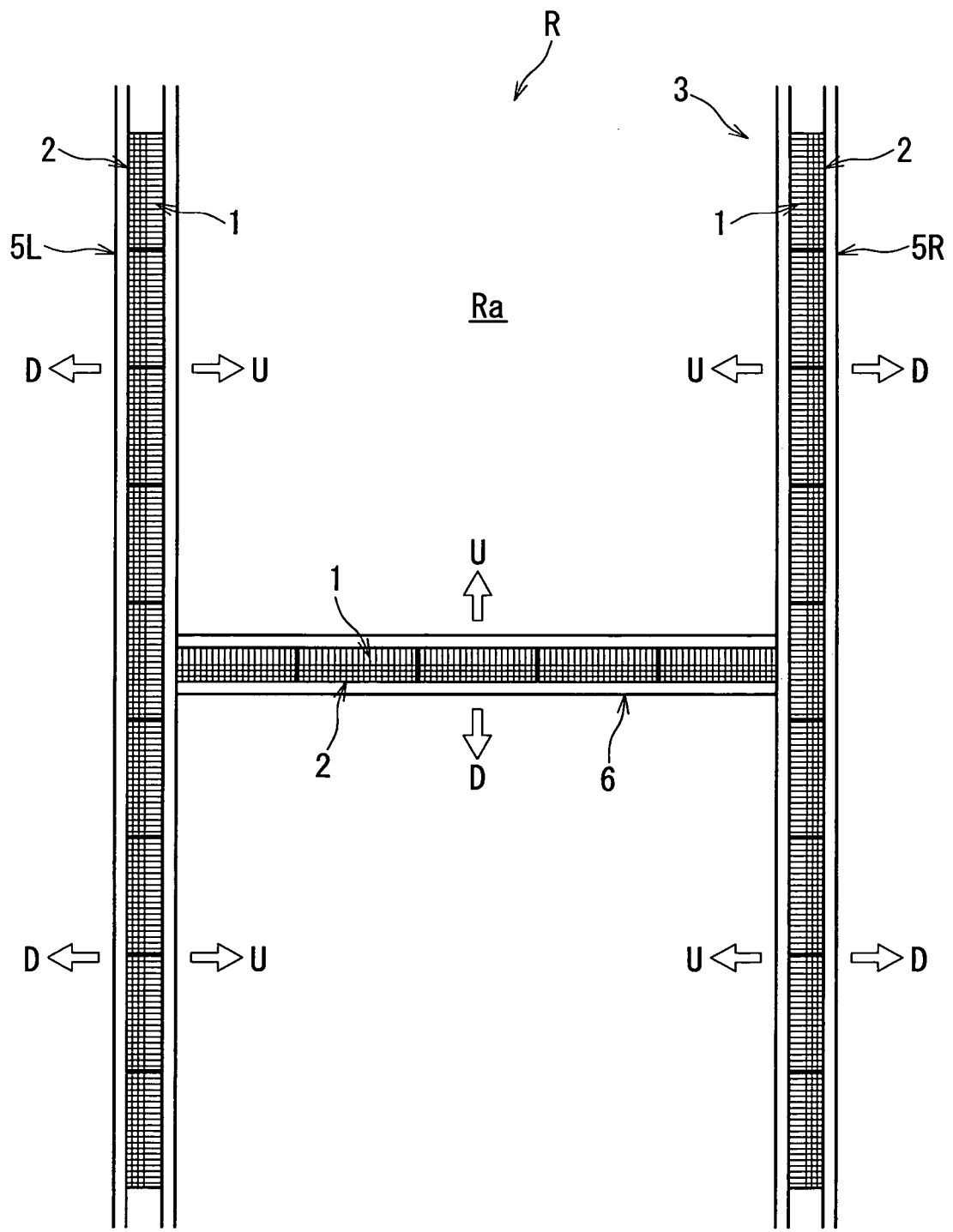
FIG. 1 is a plan view showing a drainage structure provided with a grating cover having a water collecting structure according to a first embodiment of the invention.
Figure 2:
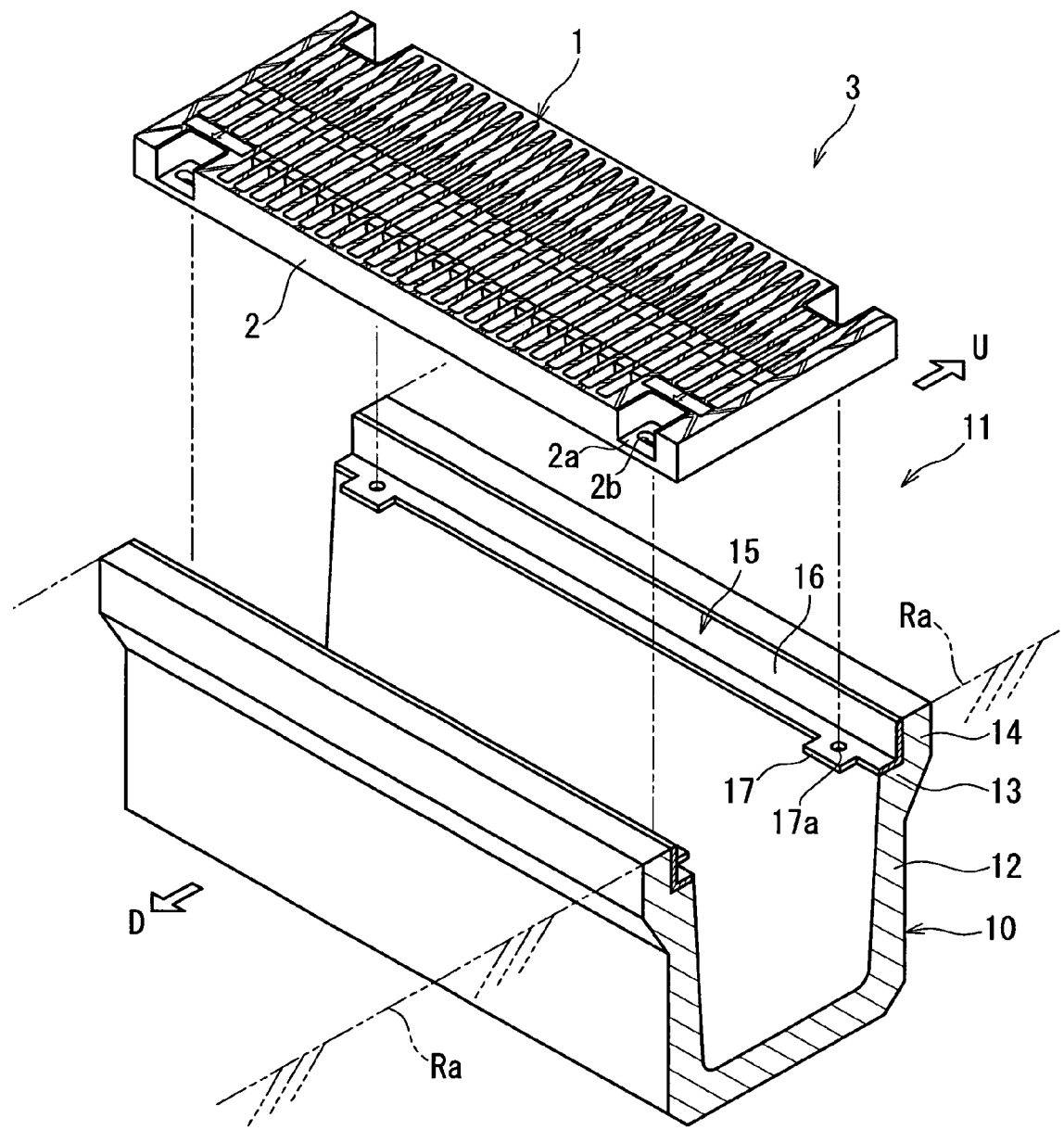
FIG. 2 is a fragmentary perspective view showing the drainage structure provided with the grating cover having the water collecting structure according to the first embodiment of the invention.

FIG. 1 shows a drainage structure 3 employing a grating cover 2 having a water collecting structure 1 according to a first embodiment of the invention. FIG. 2 shows a relation between the grating cover 2 and a ditch constituting the drainage structure 3.

As shown in FIG. 1, this road R is constructed such that a road surface Ra as a water-flow surface includes a water-flow slope inclined downwardly toward transversely outer sides thereof (right and left outer sides as seen in FIG. 1), and a water-flow slope inclined downwardly toward a longitudinally lower side (the lower side as seen in FIG. 1). The road R is provided with ditches as the drainage structure 3. The ditch includes left and right longitudinal ditches 5L, 5R longitudinally embedded in the road R, and a transverse ditch 6 transversely embedded in the road in a manner to interconnect the left and right longitudinal ditches 5L, 5R.

The left and right longitudinal ditches 5L, 5R are laid along the opposite sides of the road R in parallel relation. A plurality of grating covers 2 are juxtaposed in the longitudinal direction of the road R. On the other hand, the transverse ditch 6 is laid orthogonally to the left and right longitudinal ditches 5L, 5R. A plurality of grating covers 2 are juxtaposed in the transverse direction of the road R.

The left and right longitudinal ditches 5L, 5R are connected to catch basins (not shown), such that the water, such as rainwater, collected in the longitudinal ditches 3 is finally discharged into sewer.

As shown in FIG. 2, the ditch 3 includes: a ditch block 10 having an upper opening and embedded in a manner that an upper end surface thereof is flush with the road surface Ra; and a grating 11 fitted in the opening of the ditch block 10.

The ditch block 10 is formed of site-cast concrete or precast concrete. The ditch block includes: a block body 12 having a U-shaped section; bases 13 extending transversely outwardly from right-hand and left-hand upper ends of the block body 12; and edges 14 extending upwardly from respective extension ends of the bases 13.

The grating 11 includes: a grating frame 15 fixed to the block body 12 in a manner that an upper end thereof is flush with the road surface Ra; and a plurality of grating covers 2 fitted in the grating frame 15 in a manner to be flush with the road surface Ra.

The grating frame 15 is formed of a frame material 16 having an overall configuration of rectangle and an L-shaped section. The grating frame is fixed to the base 13 and edge 14 of the block body 12 in a manner that an upper end of the frame is flush with the road surface Ra. The frame material 16 is formed with fixing plates 17 at predetermined space intervals in a longitudinal direction thereof. The fixing plates 17 are each formed with a through-hole 17a.

Each of the grating covers 2 is formed of a steel sheet or cast iron in a rectangular shape substantially conforming to inside circumferences of the grating frames 15. The grating cover is formed with fixing portions 2a at four corners thereof. Each of the fixing portions 2a is formed with an elongate hole 2b. The through-hole 17a of the fixing plate 17 and the elongate hole 2b of the fixing portion 2 are fastened by means of bolt and nut, so that the grating cover 2 is removably secured to the grating frame 15.

Incidentally, the grating cover 2 may also be formed in a square shape substantially conforming to the inside circumferences of the grating frames 15.

Figure 3:
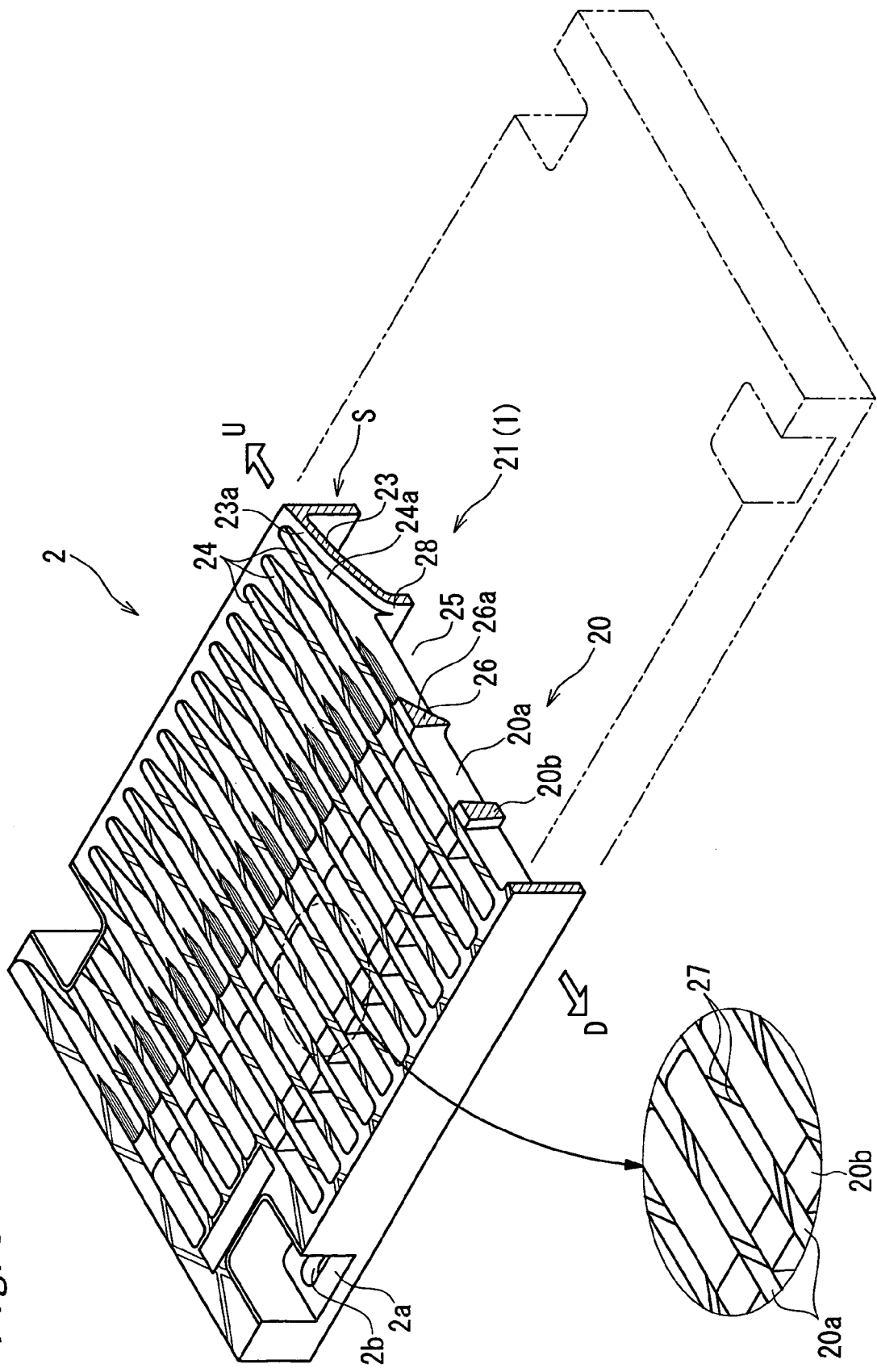
FIG. 3 is a fragmentary perspective view showing the grating cover having the water collecting structure according to the first embodiment of the invention.

FIG. 3 shows the grating cover 2 partly in section, which includes the water collecting structure 1 according to the first embodiment of the invention.

As shown in FIG. 3, the grating cover 2 includes: a grating portion 20 disposed on a downstream side D of flowing water; and a catch-enhancing portion 21 as the water collecting structure 1 which is disposed on an upstream side U of the flowing water. The grating portion 20 and the catch-enhancing portion 21 are unified.

The grating portion 20 includes: a plurality of vertical bars 20a extended in the flow direction (transverse direction) of the grating cover 2; and a cross bar 20b orthogonally connected with the individual vertical bars 20a, the vertical bars and the cross bar constituting the grating structure. It is noted that the size and arrangement of the grating portion 20 are illustrated merely by way of example herein and are not limited to those of the embodiment.

The catch-enhancing portion 21 includes: a guide member 23 having a water channeling surface 23a inclined at a greater angle than that of the water-flow slope of the road surface Ra of the road R; and a plurality of flow straightening plates 24 extended along the flow direction of the guide member and juxtaposed in a direction orthogonal to the flow direction.

The flow straightening plate 24 includes a planar lateral side 24a which cooperates with the water channeling surface 23a to define a small channel S of a substantially rectangular shape. The lateral side 24a stands vertically relative to the water channeling surface 23a.

The catch-enhancing portion 21 further includes a cross member 26 which is extended crossways as disposed on a downstream side D of the guide member 23 via a catch passage 25 opened downwardly and which has an upper end surface positioned at a higher level than that of a downstream portion of the guide member 23.

According to the embodiment, the guide member 23 is further formed with a downslope portion 28 on a downstream side thereof, the downslope portion curved downward with inclination progressively increased toward the downstream side D. This ensures that the flowing water reaching the downstream portion of the guide member 23 is guided into the catch passage 25.

The flow straightening plate 24 is disposed in a manner to fill a height gap between the water channeling surface 23a of the guide member 23 and the upper end surface of the cross member 26. An upstream portion of the flow straightening plate projects integrally from a surface of the guide member 23, whereas a downstream portion continuous to the upstream portion overhangs toward the catch passage 25. Each flow straightening plate 24 has its downstream end connected integrally with the cross member 26, whereas an upper end surface of the flow straightening plate 24 and the upper end surface of the cross member 26 define a plane flush with the road surface Ra.

Furthermore, the upper end surface of the flow straightening plate 24 is formed with an antislip tread 27. Specifically, a plurality of antislip grooves are formed crosswise in the upper end surface of the flow straightening plate 24.

Alternatively, the antislip grooves may be replaced by a sheet-like material having an uneven surface, which may be affixed to the upper end surface of the flow straightening plate 24 by means of an adhesive or the like. The antislip means is not limited to the embodiment so long as such means is capable of preventing slip by increasing frictional resistance.

The cross member 26 is substantially formed in a triangular shape in section and includes a reflection surface 26a inclined upwardly toward the upstream side U. The reflection surface 26a serves to positively guide the flowing water into the catch passage 25.

Now, description is made on the flow of the flowing water, such as rainwater, which runs on the road surface Ra of the road R including the ditches 3 of the above constitution.

The water flowing in the longitudinal direction is principally collected by the transverse ditch 6. Since the catch-enhancing portion 21 as the water collecting structure 1 is disposed on the upstream side U of the transverse ditch 6, the flowing water is prevented from trapping the air in the bottom thereof even if the flowing water forms a shooting flow. Hence, the flowing water is guided along the water channeling surface 23a of the guide member 23 and into the catch passage 25.

The water flowing in the transverse direction is collected by the left and right longitudinal ditches 5L, 5R. These longitudinal ditches 5L, 5R are provided with the catch-enhancing portions 21 on the upstream sides U thereof. Hence, the flowing water is prevented from trapping the air in the bottom thereof so that the flowing water is assuredly guided along the water channeling surfaces 23a of the guide members 23 and into the ditches.

Figure 4A:
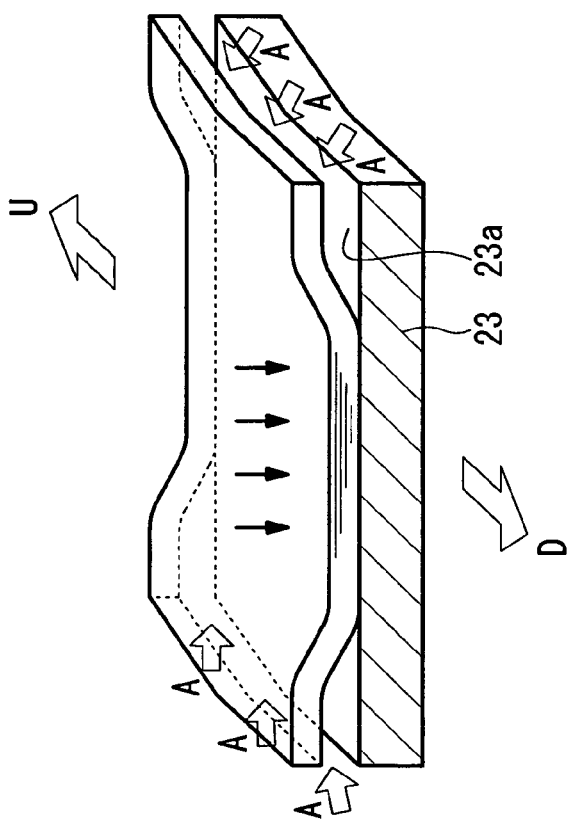
FIG. 4 is a perspective view schematically showing the behavior of water flowing into the water collecting structure according to the first embodiment of the invention.
Figure 4B:
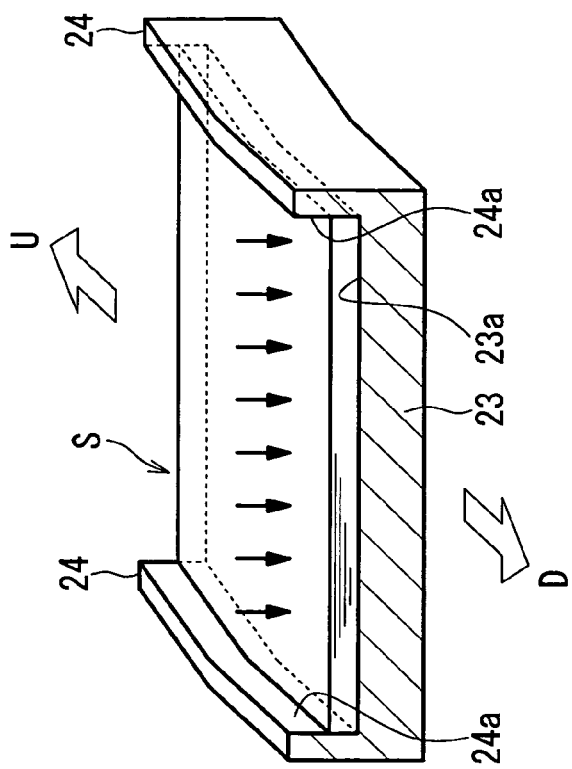

FIG. 4(a) schematically shows the behavior of the water flowing on the water channeling surface 23a in a case where the flow straightening plates 24 are not provided. FIG. 4(b) schematically shows the behavior of the flowing water in a case where the flow straightening plates 24 are provided.

In the case of FIG. 4(a), the flowing water traps air A from lateral sides in the bottom thereof so that the water flow is separated from the water channeling surface 23a at the widthwise opposite sides thereof. This makes it difficult to efficiently guide the flowing water into the catch passage 25. In the case of FIG. 4(b), the water flow on the water channeling surface 23a of the guide member 23 is divided off at the widthwise opposite sides thereof by means of the lateral sides 24a of the flow straightening plates 24. Hence, the flowing water is prevented from trapping the air A from lateral sides in the bottom thereof.

Even in the case where the flow straightening plates 24 are provided, a phenomenon of the flowing water separating from the water channeling surface 23a tends to occur if a distance between a respective pair of opposing lateral sides 24a of the flow straightening plates 24, the distance equivalent to a width of the small channel S, is excessively great relative to a depth of the water flowing through the small channel S. It is therefore preferred that the width of the small channel S is substantially equal to the depth of the flowing water. Specifically, the distance between a respective pair of opposing flow straightening plates 24 may preferably be 2 cm at minimum because the depth of the water flowing through the small channel S of the embodiment is on the order of 2 cm. Then, a length of the flow straightening plate 24 between the water channeling surface 23a and a top end thereof, the length defining the depth of the small channel S, may preferably be on the order of 3 cm, which is slightly greater than the above water depth.

In a case where the lateral sides 24a of the flow straightening plates 24 are extended as inclined relative to the water channeling surface 23a to diminish the small channel toward top, the phenomenon of the flowing water separating from the water channeling surface 23a tends to occur because the flowing water does not closely follow the configuration of the lateral sides 24a of the flow straightening plates 24 and hence, traps the air therein.

Even in a case where the flowing water contains a waste material such as fallen leaves, the longitudinal ditches 5L, 5R and the transverse ditch 6 are so designed to allow the flowing water to push the waste material to the downstream side D. Therefore, the catch passage 25 of the grating cover 2 is maintained in an open state, ensuring that the flowing water falls into the ditch.

A drainage performance with the accumulation of the above waste material may be attained irrespective of the water-flow slope of the road R. Therefore, the grating cover 2 having the water collecting structure 1 of the invention may be installed on a flat road (road having a water-flow slope of 0°). In this case, as well, the invention may offer a working effect that the drainage performance is scarcely decreased when the waste material is accumulated.

As described above, the water collecting structure 1 includes a plurality of flow straightening plates 24 extended along the flow direction of the guide members 23 and juxtaposed in the direction orthogonal to the flow direction. The flow straightening plates 24 include the planar lateral sides 24a cooperating with the water channeling surfaces 23a to define the small channels S having the substantially rectangular shape. The lateral sides 24a are extended as vertically angled relative to the water channeling surfaces 23a. Accordingly, the water flowing on the water channeling surface 23a of the guide member 23 is divided off at the opposite sides thereof by means of the lateral sides 24a of the flow straightening plates 24. This is effective to prevent the water flowing on the water channeling surface 23a from trapping the air in the bottom thereof. Thus, the flowing water is prevented from separating from the water channeling surface 23a.

Furthermore, the upper end surface of the flow straightening plate 24 is disposed flush with the road surface Ra of the road R, thus effectively obviating the formation of a step which may block foot or vehicle traffic. What is more, the antislip tread 27 is formed on the upper end surface of the flow straightening plate 24 such that pedestrians and vehicles may be prevented from slipping during passage. On the other hand, the aforementioned drainage structure 3 is provided with the above water collecting structure 1. Therefore, the drainage structure is capable of positively capturing the flowing water even when the flowing water forms the shooting flow.

Figure 5:
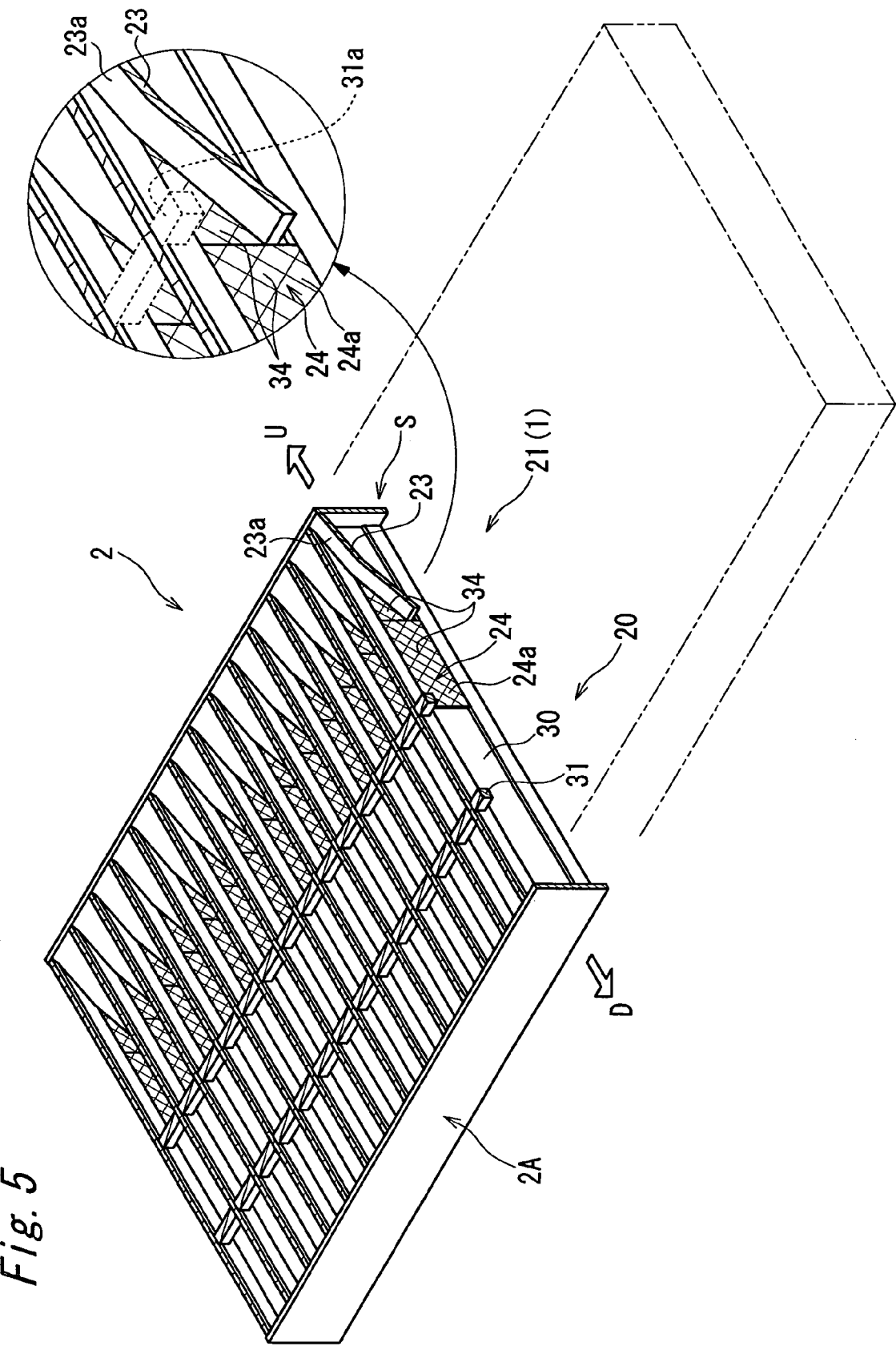
FIG. 5 is a fragmentary perspective view showing a grating cover having a water collecting structure according to a second embodiment of the invention.
Figure 6:
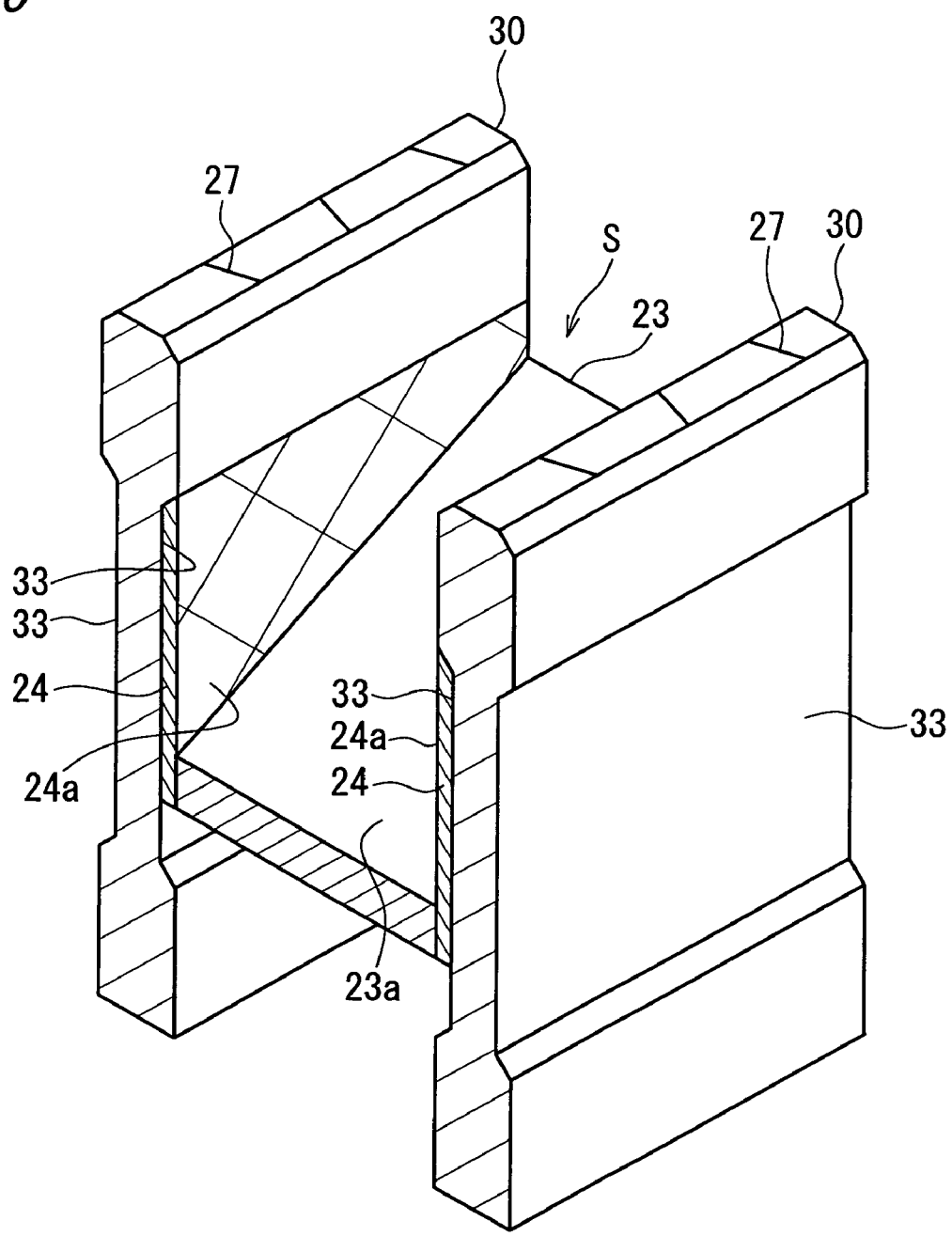
FIG. 6 is a fragmentary sectional view showing vertical bars.

FIG. 5 shows a grating cover 2 according to a second embodiment partly in section. FIG. 6 shows a vertical bar 30 of FIG. 5 partly in section.

This embodiment differs from the first embodiment in that the water collecting structure 1 of the invention is provided in a commercially available grating cover 2A.

As shown in FIG. 5 and FIG. 6, the commercially available grating cover 2A includes: a plurality of vertical bars 30 extended in the flow direction (transverse direction) and having an I-shaped section; and a plurality of cross bars 31 having a square cylinder shape and orthogonally connected with the individual vertical bars 30. The water collecting structure 1 is provided on the upstream side U of the commercially available grating cover 2A as follows.

Specifically, the grating cover 2 of the embodiment is provided with the water collecting structure 1 by taking the following procedure. Cross bars 31*a* disposed on the upstream side U of the commercially available grating cover 2A are removed. Plates 34 are bonded to each pair of recesses 33 formed on widthwise opposite sides of the vertical bar 30, thereby forming the flow straightening plates 24. A guide member 23 formed by bending a steel sheet is fixed to space between a respective pair of vertical bars 30.

The grating cover 2A having the water collecting structure 1 of the embodiment is adapted to offer the same working effect as that of the first embodiment.

It is noted that the commercially available grating cover 2A may be manufactured such that the vertical bar 30 has a rectangular section instead of the I-shaped section. In this case, the water collecting structure 1 may be constructed by fixing the guide member 23 to the vertical bar 30 having the rectangular section. Incidentally, the plate 34 and the guide member 23 used for constituting the flow straightening plate 24 of the water collecting structure 1 may be formed from a material such as plastics.

The foregoing embodiments merely illustrate the invention and are not to be considered as limiting the scope thereof. The scope of the invention is defined by the appended claims and all changes that fall within meets and bounds of equivalences to the constitutions herein are construed as included in the invention.

For instance, the lateral side 24*a* of the flow straightening plate 24 may be extended as inclined relative to the water channeling surface 23*a* of the guide member 23 in a manner to progressively widen the small channel toward top. Alternatively, the flow straightening plate 24 may have a curved lateral side 24*a* which cooperates with the water channeling surface 23*a* to define a substantially rectangular small channel S. In these cases, as well, the flowing water may be prevented from separating from the water channeling surface 23*a*.

The water collecting structures (water collecting gratings) 1 according to the foregoing embodiments are characterized by including the following three members (a) to (c).

(a): the guide member 23 including the water channeling surface 23*a* inclined at a greater angle than that of the water-flow slope of the water-flow surface of the road R, (b): the cross member 26 disposed downstream from the guide member 23 via the catch passage 25 opened downwardly, having the upper end surface at a higher level than that of the downstream portion of the guide member 23, and extended in a crosswise direction orthogonal to the flow direction, (c): a plurality of flow straightening plates 24 functioning as a bottom raising rib for interconnecting the guide member 23 and the cross member 26 in a manner to fill the height gap between the water channeling surface 23*a* of the guide member 23 and the upper end surface of the cross member 26.

According to the water collecting grating 1 having the above constitution, the guide member 23 includes the water channeling surface 23*a* inclined at a greater angle than that of the water-flow slope of the water-flow surface of the road R. Even if the water flowing on the water-flow surface of the road R forms the shooting flow, therefore, such a flow is guided along the water channeling surface 23*a* of the guide member 23 and into the catch passage 25.

The cross member 26 disposed downstream from the guide member 23 has the upper end surface positioned at the higher level than that of the downstream portion of the guide member 23. Accordingly, if some of the water flowing down on the water channeling surface 23 of the guide member 23 jumps due to the occurrence of turbulence or the like, the jumping water impinges on the cross member 26 so as to fall into the catch passage 25.

In the above grating 1, on the other hand, the plural flow straightening plates 24 interconnect the guide member 23 and the cross member 26 in a manner to fill the height gap between the water channeling surface 23*a* of the guide member 23 and the upper end surface of the cross member 26. Thus, the existence of the plural flow straightening plates 24 functioning as the bottom raising ribs eliminates the formation of the step between the guide member 23 and the cross member 26. The grating 1 is adapted to effectively obviate the formation of the step which may block vehicle traffic and to properly guide the water flowing on the water-flow surface of the road into the falling movement.

According to the above grating 1, the specific configurations of the flow straightening plate 24 and the cross member 26 are not limited to particular configurations. However, it is preferred that the flow straightening plate 24 and the cross member 26 have their upper end surfaces formed flat and substantially flush with the water-flow surface of the road R. In this case, any step is not formed between the individual flow straightening plates 24 and cross member 26 and the surface of flowing water therearound. This leads to even further enhanced traffic safety.

If the member including the reflection surface 26*a* inclined upwardly toward the upstream side is used as the cross member 26, as shown in the figure, the following advantage may be obtained. Even if the flowing water, which is caused to jump due to the occurrence of turbulence, impinges on the reflection surface 26*a*, the impinging water is reflected downward by the reflection surface 26*a*. Hence, the flowing water may be more assuredly guided into the catch passage 25, as compared with a case where the reflection surface 26*a* is extended vertically.

On the other hand, in a case where a difference between the inclinations of the water-flow surface of the road R and of the water channeling surface 23*a* of the guide member 23 is too great (for example, an inclination difference in excess of 30° at a flow rate of 4 L/sec (provided that the slope of the water channel is up to 20%), the separation of the flowing water may occur at an intersection of the water-flow surface and the water channeling surface 23*a*. Hence, the turbulence may occur at the water separation area, so that the flowing water may not follow the bottom of the water channel. The occurrence of such a phenomenon leads to a reduced water-collecting efficiency. On the other hand, if the difference between the inclinations of these surfaces is too small, the guide member 23 must be extremely increased in length in the flow direction in order to obtain a required height difference from the cross member 26.

It is therefore recommendable to employ the guide member 23, the water channeling surface 23*a* of which includes a first slant surface on the upstream side and a second slant surface disposed on the downstream side and having a greater inclination than that of the first slant surface, such that the inclination of the slant surface may be varied at some mid point. In a case where such a water channeling surface 23*a* is employed, the inclination difference between the water-flow surface and the first slant surface is minimized to obviate the occurrence of the turbulence associated with the flow separation. In addition, the second slant surface having the greater inclination is provided downstream from the first slant surface, whereby the guide member may effectively obtain the required height difference from the cross member as extended in a predetermined range in the flow direction.

Furthermore, the downslope portion 28 (FIG. 3) curved downward with inclination progressively increased toward the downstream side may be disposed at the downstream portion of the guide member 23. This ensures that the whole mass of the flowing water reaching the downstream portion of the guide member 23 is guided into the catch passage 25, resulting in a further increased water-collecting efficiency.

When the aforementioned water collecting grating 1 is applied to the drainage structure at the side of the road, the water collecting gratings 1 may be contiguously laid on the upstream side of the grating frame. Otherwise, as shown in FIG. 3 and FIG. 5, the upstream portion of the grating cover 2 may be constituted by the water collecting grating 1.

INDUSTRIAL APPLICABILITY

The invention relates to the water collecting structure capable of positively capturing the flowing water even when the flowing water forms the shooting flow. The water collecting structure may be applied to, for example, the grating cover disposed on the ditches of the road.

What is claimed is:

1. A water collecting structure comprising:
   a guide member including a water channeling surface inclined at a greater angle than that of a water-flow slope of a water-flow surface;
   a plurality of flow straightening plates extended along a flow direction of the guide member and juxtaposed in a direction orthogonal to the flow direction; and
   a cross member disposed downstream from the guide member via a catch passage opened downwardly, having an upper end surface at a higher level than that of the downstream portion of the guide member, and extended in a crosswise direction orthogonal to the flow direction,
   wherein the cross member is located so as to allow flowing water to push a waste material such as fallen leaves to the downstream side, even in a case where the flowing water contains such waste material, and thereby maintaining the catch passage in an open state;
   wherein the flow straightening plate includes a planar or curved lateral side which cooperates with the water channeling surface to define a substantially rectangular small channel and which stands vertically to the water channeling surface or inclined relative to the water channeling surface to widen the small channel toward a top thereof.

2. A water collecting structure according to claim 1, wherein an upper end surface of the flow straightening plate is flush with the water-flow surface.

3. A water collecting structure according to claim 1 or 2, wherein an upper end surface of the flow straightening plate is formed with an antislip tread.

4. A road drainage structure comprising: a grating frame embedded in road in a manner that an upper end surface thereof is flush with a water-flow surface; and a grating cover fitted in the grating frame in a manner to be flush with the water-flow surface,
   wherein the water collecting structure according to any one of claim 1 or 2, is disposed on an upstream side of the grating cover.

* * * * *